(12) United States Patent
Das et al.

(10) Patent No.: US 8,411,684 B1
(45) Date of Patent: Apr. 2, 2013

(54) SYSTEM, METHOD, AND COMPUTER PROGRAM PRODUCT FOR DETERMINING A HOP COUNT BETWEEN NETWORK DEVICES UTILIZING A BINARY SEARCH

(75) Inventors: Sudeep Das, Bangalore (IN); Anil Z. Chakravarthy, Bangalore (IN); Sameer Shashikant Paranjape, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 295 days.

(21) Appl. No.: 12/605,695

(22) Filed: Oct. 26, 2009

(51) Int. Cl.
*H04L 12/56* (2006.01)

(52) U.S. Cl. ......... 370/392; 370/238; 370/251; 370/254

(58) Field of Classification Search ............. 370/395.53, 370/390, 351, 389, 392; 709/232, 223
See application file for complete search history.

(56) References Cited

U.S. PATENT DOCUMENTS

| | | | |
|---|---|---|---|
| 5,940,372 A * | 8/1999 | Bertin et al. ................. | 370/238 |
| 5,987,610 A | 11/1999 | Franczek et al. | |
| 6,073,142 A | 6/2000 | Geiger et al. | |
| 6,460,050 B1 | 10/2002 | Pace et al. | |
| 6,880,025 B2 * | 4/2005 | Toguchi et al. ............... | 710/104 |
| 7,002,917 B1 * | 2/2006 | Saleh ............................ | 370/238 |
| 7,269,657 B1 * | 9/2007 | Alexander et al. ............ | 709/229 |
| 7,506,155 B1 | 3/2009 | Stewart et al. | |
| 7,716,727 B2 * | 5/2010 | Phillips et al. ................. | 726/11 |
| 7,961,626 B2 * | 6/2011 | Reeve ........................... | 370/238 |
| 8,190,630 B2 * | 5/2012 | Nakadai ....................... | 707/769 |
| 2004/0004939 A1 * | 1/2004 | Yegenoglu .................... | 370/252 |
| 2004/0220947 A1 * | 11/2004 | Aman et al. .................. | 707/100 |
| 2005/0091350 A1 * | 4/2005 | Bejerano et al. ............. | 709/223 |
| 2005/0108415 A1 * | 5/2005 | Turk et al. .................... | 709/232 |
| 2005/0265356 A1 * | 12/2005 | Kawarai et al. .......... | 370/395.53 |
| 2006/0112297 A1 * | 5/2006 | Davidson ........................ | 714/2 |
| 2006/0117208 A1 * | 6/2006 | Davidson ........................ | 714/4 |
| 2007/0070909 A1 * | 3/2007 | Reeve ........................... | 370/238 |
| 2008/0031246 A1 * | 2/2008 | Hasha et al. .................. | 370/390 |
| 2008/0056178 A1 * | 3/2008 | Alexander et al. ............ | 370/328 |

* cited by examiner

*Primary Examiner* — Hassan Kizou
*Assistant Examiner* — Emmanuel Maglo
(74) *Attorney, Agent, or Firm* — Patent Capital Group

(57) ABSTRACT

A system, method, and computer program product are provided for determining a hop count between network devices utilizing a binary search. In use, a hop count range is identified based on a maximum hop count value. Furthermore, a plurality of packets are sent from a source device to a destination device for determining a hop count between the source device and the destination device, each of the packets having a different hop count threshold configured based on a binary search applied to the hop count range.

19 Claims, 4 Drawing Sheets

SYSTEM, METHOD, AND COMPUTER PROGRAM PRODUCT FOR DETERMINING A HOP COUNT BETWEEN NETWORK DEVICES UTILIZING A BINARY SEARCH

FIELD OF THE INVENTION

The present invention relates to communications between network devices, and more particularly to identifying a hop count on the network between such network devices.

BACKGROUND

Traditionally, a distance between network devices has been represented by a hop count (i.e. a number of hops) on a network between the network devices. The hop count has generally indicated a number of transitions on a network that must be made when communicating between the network devices. Unfortunately, traditional techniques for determining a hop count on a network between network devices have exhibited various limitations.

Just by way of example, hops have conventionally been determined by sending network ping messages from a source device to a destination device, where each message has a sequentially increasing hop count threshold, until a network echo response is received by the source device from the destination device. However, such a technique is conventionally time consuming and generates a significant amount of network traffic. Specifically, a number of hops on a network between network devices has been determined via traceroute and/or netmask operations. The traceroute operations have required a linear sequential search and have generated a significant amount of network traffic, whereas the netmask operations have generally provided inaccurate determinations of hop counts while also causing substantial bandwidth usage.

There is thus a need for addressing these and/or other issues associated with the prior art.

SUMMARY

A system, method, and computer program product are provided for determining a hop count between network devices utilizing a binary search. In use, a hop count range is identified based on a maximum hop count value. Furthermore, a plurality of packets are sent from a source device to a destination device for determining a hop count between the source device and the destination device, each of the packets having a different hop count threshold configured based on a binary search applied to the hop count range.

DETAILED DESCRIPTION

Figure 1:
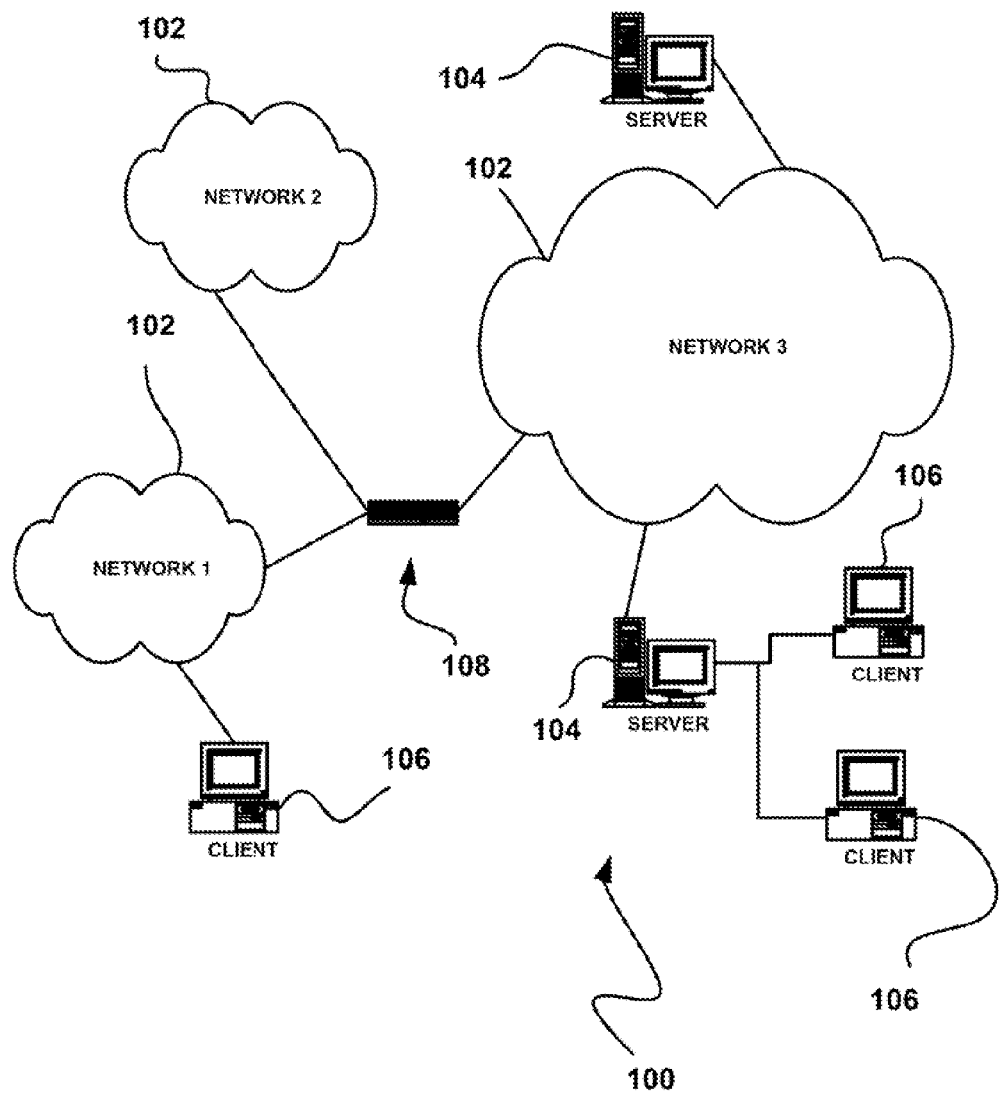
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
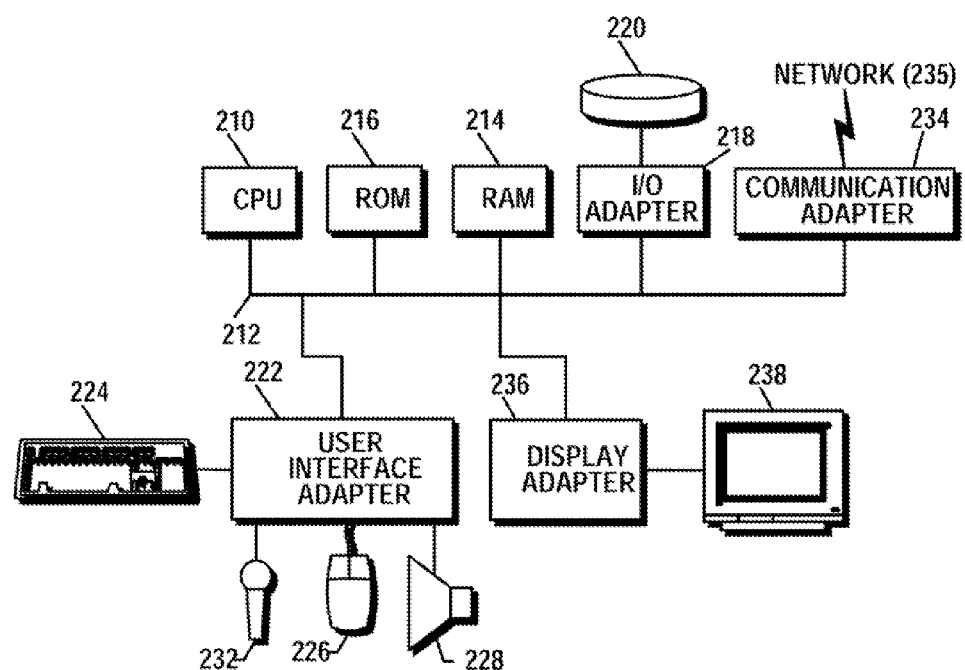
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
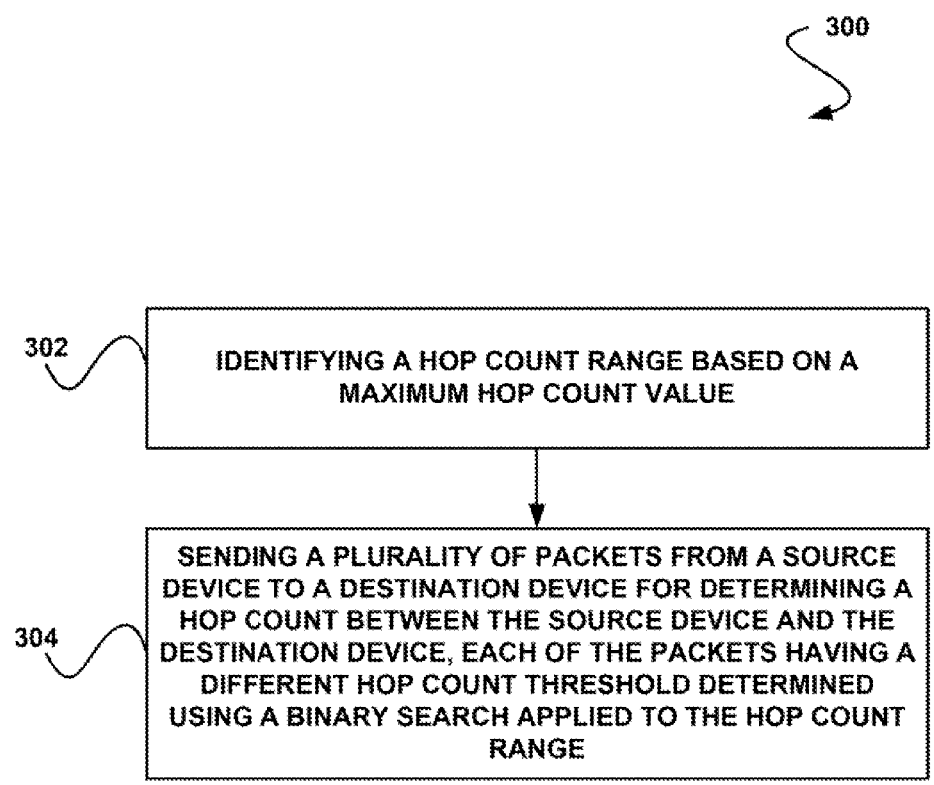
FIG. 3 shows a method for determining a hop count between network devices utilizing a binary search, in accordance with another embodiment.

FIG. 3 shows a method 300 for determining a hop count between network devices utilizing a binary search, in accordance with another embodiment. As an option, the method 300 may be carried out in the context of the architecture and environment of FIGS. 1 and/or 2. Of course, however, the method 300 may be carried out in any desired environment.

As shown in operation 302, a hop count range is identified based on a maximum hop count value. The maximum hop count value may include any predefined value which indicates a maximum hop count (i.e. a maximum number of hops) that may be utilized in determining a hop, count between network devices. In one embodiment, the maximum hop count value may be pre-configured by a user.

Additionally, the hop count range that is identified based on the maximum hop count value may include any range (of hop count values) between a predefined hop count value and the maximum hop count value. In one embodiment, the predefined hop count value may include zero. Thus, in such embodiment, the hop count range may be identified by determining a range between the hop count value of zero and the maximum hop count value. Just by way of example, if the maximum hop count value is pre-configured to be 16, the hop count range may be 0 to 16.

Furthermore, as shown in operation 304, a plurality of packets are sent from a source device to a destination device for determining a hop count between the source device and the destination device, each of the packets having a different hop count threshold configured based on a binary search applied to the hop count range. In the context of the present description, the source device and the destination device each include any devices (e.g. as shown via the servers 104 and/or clients 106 in FIG. 1, etc.) that are capable of communicating via at least one network. Thus, the source device and the destination device may be located on a single network or on different networks in communication with one another.

To this end, the network communications from the source device that are destined for the destination device may be required to make a number of hops (e.g. transitions) prior to being delivered to the destination device. Such number of hops may include, in one embodiment, a number of intermediary network devices (e.g. routers, etc.) traversed by the network communications when being communicated from the source device to the destination device. It should be noted that the number of hops described above is hereinafter referred to as the hop count between the source device and the destination device. Thus, the hop count between the source device and the destination device may include a number of network devices between the source device and the destination device through which a packet must be sent for receipt by the destination device.

The packets sent from the source device to the destination device for the determining the hop count between the source device and the destination device may each indicate the hop count threshold associated therewith. For example, each of the packets may be a ping message. Further, a field (e.g. time to live field) of the ping message may optionally include a value of the hop count threshold associated therewith.

In the context of the present description, the hop count threshold may include a threshold number of hops over which an associated packet is allowed to be communicated. Since each of the packets sent from the source device to the destination device may have a different hop count threshold configured based on the binary search applied to the hop count range (as described below), it may be determined which of the packets has a hop count indicative of the hop count between the source device and the destination device.

In one embodiment, the binary search may configure the hop count threshold for a packet based on a determination of whether a response packet (e.g. acknowledgment packet, echo response packet, etc.) was received at the source device from the destination device, where the response packet acknowledges receipt of a last one of the packets sent from the source device to the destination device. For example, the binary search may be applied to the hop count range by repeatedly bisecting the hop count range and selecting a hop count threshold from a section of the bisected hop count range based on the aforementioned determination. In this way, the hop count between the source device and the destination device may be determined using the binary search as applied to the hop count range, without necessarily requiring that a plurality of packets with an incremental sequence of hop count thresholds be sent from the source device to the destination device.

In one embodiment, the binary search may be applied to the hop count range such that a first one of the packets (hereinafter first packet) sent from the source device to the destination device is configured to have a hop count threshold equal to the maximum hop count value. As the first packet is sent from the source device to the destination device, each hop made by the packet may result in the hop count threshold for such packet being decremented (e.g. decreased by the value "1"). For example, upon receipt of the packet by an intermediary network device, the intermediary network device may decrement the hop count threshold and may forward the packet toward the destination device (e.g. for receipt by another intermediary network device, if one exists, or by the destination device if no other intermediary network devices exist). It should be noted that the above described decrementing of the hop count threshold by intermediary devices may be applied to each packet sent from source device to the destination device.

If the hop count threshold of the first packet is decremented to zero by an intermediary device (i.e. becomes zero before being received by the destination device), an expiration message (e.g. a time to live expired message) may be returned to the source device by the intermediary device that decremented the hop count threshold to zero. The expiration message may accordingly indicate to the source device that the packet expired prior to being received by the destination device and thus that the hop count threshold of the first packet, which is the maximum hop count value as described above, was not sufficient for allowing the destination device to receive the first packet. If an expiration message is received in response to the first packet indicating that the maximum hop count value was not sufficient for allowing the destination device to receive the first packet, the hop count between the source device and the destination device may not be determined using the hop count range, as the hop count between the source device and the destination device may be identified as being greater than that included in the hop count range. Optionally, the maximum hop count value may be increased (e.g. by the user or automatically) and the method 300 may be repeated based on the increased maximum hop count value.

If, however, the first packet is received by the destination device, the destination device may return a response packet to the source device. In this way, it may be determined that the hop count between the source device and the destination device is within the hop count range identified based on the maximum hop count value. Upon receipt of the response packet by the source device from the destination device acknowledging receipt of the first packet, a second one of the packets (hereinafter second packet) may be sent from the source device to the destination device, where the hop count threshold for such second packet is configured by, applying the binary search to the hop count range. To this end, the hop count threshold for such second packet may be determined by bisecting the hop count range and configuring the hop count threshold for the second packet as the midpoint of the hop count range determined by the bisection.

If an expiration message is received by the source device in response to the second packet (e.g. the hop count threshold of the second packet is decremented to zero by an intermediary device), it may be determined that the hop count threshold of the second packet was not sufficient for allowing the destination device to receive the second packet. Accordingly, it may also be determined that the hop count between the source device and the destination device is not a value included in the lower half of the bisected hop count range, but is instead a value included in the upper half of the bisected hop count range. Thus, the hop count threshold for a next packet sent from the source device to the destination device may be configured by applying the binary search to the upper half of the hop count range. To this end, the hop count threshold for such next packet may be determined by bisecting the upper half of the hop count range and configuring the hop count threshold for the next packet as the midpoint of the upper half of the hop count range determined by the bisection.

If, however, the second packet is received by the destination device such that the destination device returns a response packet to the source device, it may be determined that the hop count between the source device and the destination device is within the lower half of hop count range as defined by the bisection of the hop count range. Upon receipt of the response packet by the source device from the destination device acknowledging receipt of the first packet, a next packet may be sent from the source device to the destination device, where the hop count threshold for such next packet is configured by applying the binary search to the lower half of the hop count range. In this way, the hop count threshold for such next packet may be determined by bisecting the lower half of the hop count range and configuring the hop count threshold for the next packet as the midpoint of the lower half of the hop count range determined by the bisection.

As described above, the hop count range may be bisected in a repeated manner, such that the hop count threshold for a packet sent after a bisection is performed may be identified as the midpoint of the half of the bisection (i.e. upper or lower) that is determined to include the hop count between the source device and the destination device. By using the binary search to determine the number of hops between the source device and the destination device, an amount of time required to accurately identify the number of hops may be reduced, thus further reducing resource utilization. For example, the number of hops between the source device and the destination device may be determined in $\log_2 n$ packets, where n is the number of hops from the source device to the destination device.

Just by way of example, a maximum hop count value may be pre-configured to be 16. With respect to the present example, the hop count between the source device and the destination device may be 13. Initially, the source device may send a first packet to the destination device with a hop count threshold that is the maximum hop count value (i.e. 16). Upon receipt of the first packet by any intermediary device (i.e. a device between the source device and the destination device through which the first packet is communicated), the intermediary device may decrement the hop count threshold of the packet (e.g. by updating the value of the hop count threshold stored in a field of the packet). Since the hop count between the source device and the destination device is 13, which is less than the hop count threshold for the first packet, the destination device may receive the first packet and may further send a response message to the source device.

In response to receipt of a response message by the source device, the source device may determine that the hop count between the source device and the destination device is within the hop count range of zero and the maximum hop count value (0-16). Further, the source device may send a second packet to the destination device. The hop count threshold for the second packet may be determined by applying the binary search to the hop count range (0-16), which may bisect the hop count range and configure the hop count threshold for the second packet as the midpoint of the hop count range (as determined by the bisection), which in the current example is 8. However, since the hop count between the source device and the destination device is 13, which is greater than the hop count threshold for the second packet, the destination device may not receive the second packet and instead the source device may receive an expiration message from an intermediary device.

In response to receipt of the expiration message, the source device may determine that the hop count threshold of 8 is not sufficient for the second packet to be received by the destination device, and thus that the hop count between the source device and the destination device is not within the hop count range of 0 and 8. Further, the source device may send a third packet to the destination device.

The hop count threshold for the third packet may be determined by applying the binary search to the upper half (8-16) of the previously bisected hop count range (0-16), which may bisect the upper half of the previously bisected hop count range and configure the hop count threshold for the third packet as the midpoint of the upper half of the previously bisected hop count range (as determined by the bisection), which in the current example is 12. However, since the hop count between the source device and the destination device is 13, which is greater than the hop count threshold for the second packet, the destination device may not receive the second packet and instead the source device may receive an expiration message from an intermediary device.

In response to receipt of the expiration message, the source device may determine that the hop count threshold of 12 is not sufficient for the third packet to be received by the destination device, and thus that the hop count between the source device and the destination device is not within the hop count range of 8 and 12. Further, the source device may send a fourth packet to the destination device.

The hop count threshold for the fourth packet may be determined by applying the binary search to the upper half (12-16) of the previously bisected hop count range (8-16), which may bisect the upper half of the previously bisected hop count range and configure the hop count threshold for the fourth packet as the midpoint of the upper half of the previously bisected hop count range (as determined by the bisection), which in the current example is 14. Since the hop count between the source device and the destination device is 13, which is less than the hop count threshold for the fourth packet, the destination device may receive the fourth packet and may further send a response message to the source device.

In response to receipt of a response message by the source device, the source device may determine that the hop count between the source device and the destination device is within the lower half (12-14) of the previously bisected hop count range (12-16). Further, the source device may send a fifth packet to the destination device. The hop count threshold for the fifth packet may be determined by applying the binary search to the lower half (12-14) of the previously bisected hop count range, which may bisect the lower half of the previously bisected hop count range and configure the hop count threshold for the fifth packet as the midpoint of the lower half of the previously bisected hop count range (as determined by the bisection), which in the current example is 13. Since the hop count between the source device and the destination device is 13, which is the same as the hop count threshold for the fifth packet, and since it was already determined that a hop count threshold of 12 and below was not sufficient to allow receipt of a packet by the destination device, it may be determined that the hop count between the source device and the destination device is 13.

To this end, by using the binary search to determined the hop count between the source device and the destination device, the hop count may be determined by sending a lower number of packets to the destination device than would be necessary if packets with sequentially incrementing hop count thresholds were being sent to the destination device.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
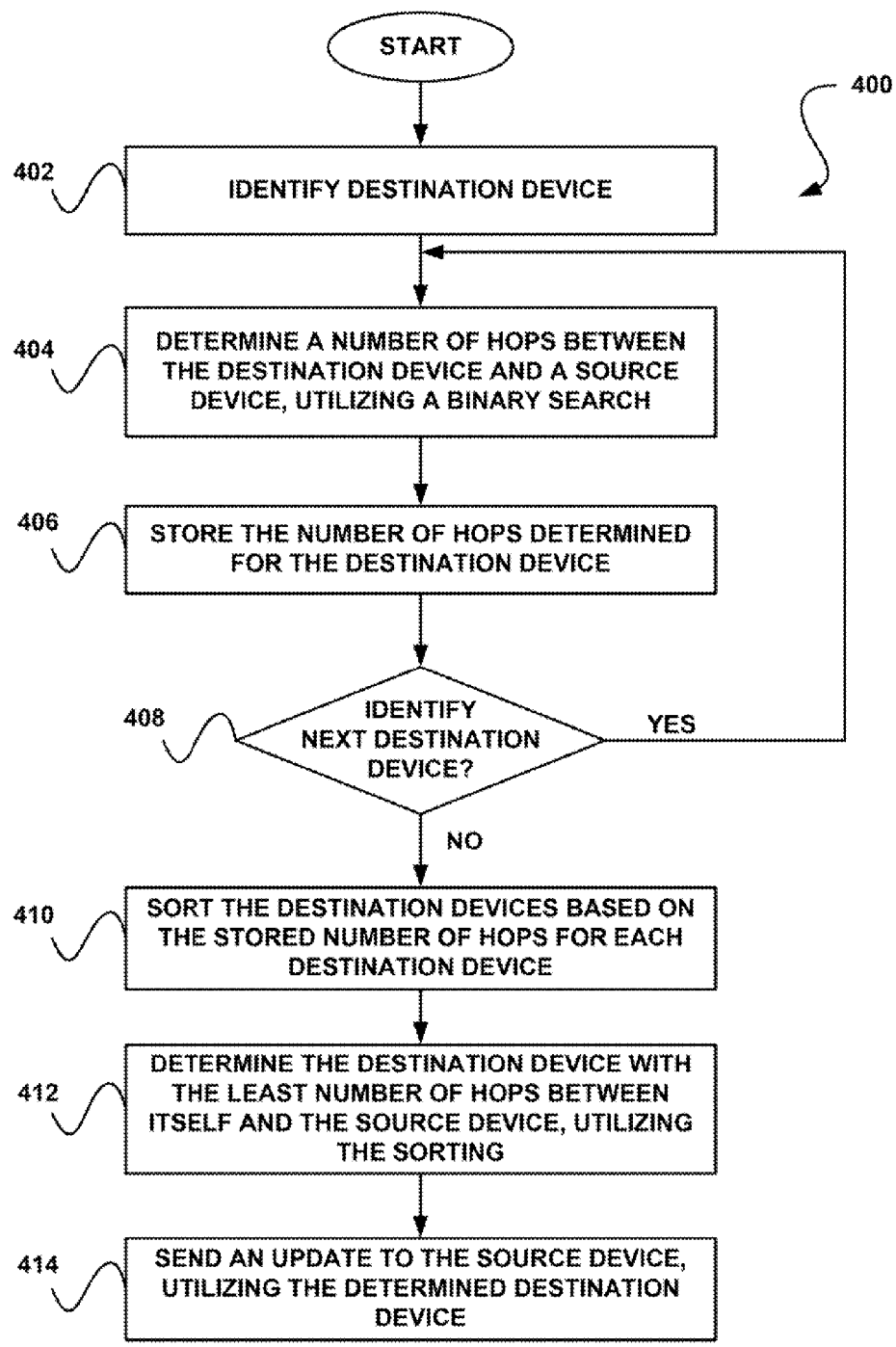
FIG. 4 shows a method for sorting a plurality of network devices based on a hop count between each of the network devices and a source device which is determined utilizing a binary search, in accordance with yet another embodiment.

FIG. 4 shows a method for sorting a plurality of network devices based on a hop count between each of the network devices and a source device which is determined utilizing a binary search, in accordance with yet another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, a destination device is identified. In the context of the present embodiment, the destination device includes any network device to which a network communication (e.g. packet) may be sent and which is capable of sending an update to a source device. For example, the destination device may include a repository storing updates (e.g. security updates, etc.) for network devices.

In one embodiment, the destination device may be identified from a plurality of destination devices. For example, the destination device may be selected from a list of destination devices available for sending an update to the source device. To this end, the destination device may optionally include a first destination device listed in the list of destination devices.

Additionally, a number of hops between the destination device and the source device is determined, utilizing a binary search. See operation 404. The number of hops between the destination device and the source device may be determined utilizing the binary search in the manner described above with respect to the method 300 of FIG. 3.

Table 1 illustrates code which may be used for determining a number of hops between the destination device and the source device, utilizing a binary search. It should be noted that such code is set forth for illustrative purposes only, and thus should not be construed as limiting in any manner.

TABLE 1

```
/*Function that returns the next higher power of 2 for a given number*/
unsigned next_power_of_2(unsigned x) {
    x = x - 1;  x = x | (x >> 1);  x = x | (x >> 2);  x = x | (x >> 4);
    x = x | (x >> 8);  x = x | (x >> 16);
    return x + 1;
}
/*
Function that sends one icmp packet, and returns 0 if
1. It receives a TTL expired message OR 2. The request times out as per the
specified timeout value else returns 1
*/
int icmp_with_given_hopcount(int nhops ,int timeout_value)
{
    //Code
}
// This method calculates number of hops existing between the source
machine and destination host int get_number_of_hops(const char *destination, int N)
{
/* The next higher power of 2 is an optimization which allows for efficient
bisection of the range during a binary search. All bisections yield even
numbers and the programmer is not required make adjustments
to compensate for rounding up of during bisection. Keeps the code simple */
    unsigned int nMaxHops = next_power_of_2(N);
    unsigned int floor = 0, ceil = nMaxHops, index =0;
    bool found = false;
/* This is a optimization to check whether a repo is reachable at all. If it cant
be reached with max hop count, it cannot be reached with any lower hop
count */
```

TABLE 1-continued

```
    int result = icmpwith_given_hopcount(N,timeout_value);
    if (result == 1)
    {
        while(true)
        {
            index = (floor + ceil)/2;
            result = icmp_with_given_hopcount(index,timeout_value);
            if (result == 1) ceil = index;
            if (result == 0) floor = index;
            int diff = ceil – floor;
            if (diff == 1)
            {
                if (ceil % 2 == 0)
                index++;
                found = true;
                break;
            }
        }
    }
    return found ? (int)index : –1;
}
```

As further shown in operation 406, the number of hops determined for the destination device is stored. For example, the number of hops between the destination device and the source device may be stored in association with an identifier of the destination device. In this way, a reference between the destination device and the number of hops associated therewith may be stored.

Moreover, it is determined whether a next destination device is identified. See decision 408. As described above with respect to operation 402, a list of destination devices available for sending an update to the source device may be maintained. For example, the destination devices may each include a repository storing updates (e.g. security updates) capable of being utilized to update the source device (e.g. a security system of the source device). Thus, determining whether a next destination device is identified may include determining whether another destination device is included on the list.

If it is determined that a next destination device is identified, the method 400 returns to operation 404 to determine a number of hops on at least one network between such next destination device and the source device, utilizing the binary search. In this way, a number of hops between the source device and each destination device capable of sending an update to the source device may be stored (operation 406).

Still yet, as shown in operation 410, the destination devices are sorted based on the stored number of hops determined for each destination device. In one embodiment, the destination devices may be sorted according from a least number of hops to a most number of hops. Of course, however, the destination devices may be sorted in any manner that is based on the stored number of hops determined for each destination device.

In addition, the destination device with the least number of hops between itself and the source device is determined utilizing the sorting. See operation 412. The destination device with the least number of hops (lowest hop count) between itself and the source device may include a target destination device selected from the list of destination devices described in operation 402. For example, if the destination devices are sorted from a least number of hops to a most number of hops, the first destination device listed after the sort may be automatically determined to be the destination device with the least number of hops between itself and the source device.

As also shown, an update is sent to the source device, utilizing the determined destination device (e.g. the target destination device). See operation 414. The update may include any code, text, etc. sent from the target destination device that is capable of updating at least one aspect of the source device, such as an application (e.g. security system) of the source device, anti-malware signatures used by the source device to detect malware, etc. In this way, the source device may be updated using the destination device with the least amount of hops therebetween, for reducing network traffic, reducing a time to update the source device, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium for performing operations, comprising:
   identifying a hop count range based on a maximum hop count value;
   sending a plurality of packets from a source device to each of a plurality of destination devices for determining a hop count between the source device and each destination device, each of the packets sent to each destination device having a different hop count threshold configured based on a binary search applied to the hop count range; and
   receiving a security update at the source device from a designated destination device, wherein the designated destination device is automatically designated from among the plurality of destination devices for sending the security update based, at least, on hop data stored as a result of the binary search and on a lowest hop count between itself and the source device from among the hop counts of the plurality of destination devices, the security update configured for updating anti-malware signatures used for malware detection by the source device.

2. The computer program product of claim 1, wherein the computer program product is operable such that the maximum hop count value is pre-configured by a user.

3. The computer program product of claim 1, wherein the computer program product is operable such that the hop count range is identified by determining a range between a hop count value of zero and the maximum hop count value.

4. The computer program product of claim 1, wherein each of the packets is a ping message.

5. The computer program product of claim 1, wherein the hop count threshold includes a number of hops over which the packet is allowed to be communicated.

6. The computer program product of claim 1, wherein the computer program product is operable such that a first one of the packets sent from the source device to the destination device has a hop count threshold equal to the maximum hop count value.

7. The computer program product of claim 1, wherein the computer program product is operable such that the binary search configures the hop count threshold based on a determination of whether a response packet was received at the source device from the destination device, the response packet including an acknowledgement or receipt of a last one of the packets sent from the source device to the destination device.

8. The computer program product of claim 1, wherein the hop count between the source device and the destination device includes a number of network devices between the source device and the destination device through which one of the packets must be sent for receipt by the destination device.

9. The computer program product of claim 1, the operations further comprising determining, for each of the plurality of destination devices, the hop count between the source device and the destination device, utilizing the binary search.

10. The computer program product of claim 4, wherein the ping message includes a field with a value of the hop count threshold.

11. The computer program product of claim 6, wherein, in response to receipt of a response packet by the source device from the destination device acknowledging receipt of the first one of the packets, the computer program product is operable such that a second one of the packets is sent from the source device to the destination device.

12. The computer program product of claim 7, wherein the response packet includes an echo response packet.

13. The computer program product of claim 9, the operations further comprising sorting the plurality of destination devices based on the hop count determined for each of the plurality of destination devices.

14. The computer program product of claim 11, wherein the hop count threshold for the second one of the packets includes a midpoint of the hop count range.

15. The computer program product of claim 13, the operations further comprising identifying the designated destination device with the lowest hop count from the plurality of destination devices, utilizing the sorting.

16. The computer program product of claim 15, wherein each of the plurality of destination devices each include a repository storing security updates capable of being utilized to update a security system of the source device.

17. A method, comprising:
   identifying a hop count range based on a maximum hop count value;
   sending a plurality of packets from a source device to each of a plurality of destination devices for determining a hop count between the source device and each destination device, each of the packets sent to each destination device having a different hop count threshold configured based on a binary search applied to the hop count range; and
   receiving a security update at the source device from a designated destination device, wherein the designated destination device is automatically designated from among the plurality of destination devices for sending the security update based, at least, on hop data stored as a result of the binary search and on a lowest hop count between itself and the source device from among the hop counts of the plurality of destination devices, the security update configured for updating anti-malware signatures used for malware detection by the source device.

18. A system, comprising:
   a processor coupled to a memory, wherein the system is configured for:
      identifying a hop count range based on a maximum hop count value;
      sending a plurality of packets from a source device to each of a plurality of destination devices for determining a hop count between the source device and each destination device, each of the packets sent to each destination device having a different hop count threshold configured based on a binary search applied to the hop count range; and
      receiving a security update at the source device from a designated destination device, wherein the designated destination device is automatically designated from among the plurality of destination devices for sending the security update based, at least, on hop data stored as a result of the binary search and on a lowest hop count between itself and the source device from among the hop counts of the plurality of destination devices, the security update configured for updating anti-malware signatures used for malware detection by the source device.

19. The system of claim 18, wherein the processor is coupled to the memory via a bus.

* * * * *

UNITED STATES PATENT AND TRADEMARK OFFICE
CERTIFICATE OF CORRECTION

PATENT NO. : 8,411,684 B1
APPLICATION NO. : 12/605695
DATED : April 2, 2013
INVENTOR(S) : Sudeep Das et al.

Page 1 of 1

It is certified that error appears in the above-identified patent and that said Letters Patent is hereby corrected as shown below:

In the Claims:

In column 9, line 62, in claim 7, delete "or" and insert -- of --, therefor.

Signed and Sealed this
Eleventh Day of June, 2013

Teresa Stanek Rea
*Acting Director of the United States Patent and Trademark Office*